(12) United States Patent
Wang

(10) Patent No.: US 7,243,240 B2
(45) Date of Patent: Jul. 10, 2007

(54) SYSTEM AND METHOD FOR FIRMWARE AUTHENTICATION

(75) Inventor: Hung-Jung Wang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 782 days.

(21) Appl. No.: 10/335,378

(22) Filed: Dec. 30, 2002

(65) Prior Publication Data

US 2004/0019796 A1 Jan. 29, 2004

(30) Foreign Application Priority Data

Jul. 26, 2002 (TW) .............................. 91116673 A

(51) Int. Cl.
  *G06F 11/30* (2006.01)
  *G06F 12/14* (2006.01)
  *H04L 9/32* (2006.01)
(52) U.S. Cl. ......................... 713/189; 713/188; 726/2
(58) Field of Classification Search ............... 713/189, 713/188; 726/2
  See application file for complete search history.

(56) References Cited

U.S. PATENT DOCUMENTS

| 4,757,468 A * | 7/1988 | Domenik et al. ............ 713/193 |
| 5,386,469 A * | 1/1995 | Yearsley et al. ............ 713/190 |
| 5,412,730 A * | 5/1995 | Jones ........................... 380/46 |
| 5,822,423 A * | 10/1998 | Jehnert et al. .............. 379/352 |
| 5,910,989 A * | 6/1999 | Naccache ..................... 713/173 |
| 5,937,063 A | 8/1999 | Davis |
| 6,209,099 B1 | 3/2001 | Saunders |
| 6,223,266 B1 * | 4/2001 | Sartore ........................ 711/170 |
| 6,625,060 B2 * | 9/2003 | Miyauchi ............... 365/185.08 |
| 2002/0138732 A1 * | 9/2002 | Irvin ........................... 713/176 |

OTHER PUBLICATIONS

"Firmware". Microsoft Computer Dictionary, 5th Edition. 2002.*
Schneier, Bruce. Applied Crytography. 2nd Edition. John Wiley and Sons, 1996. pp. 35, 92, and 161.*
William A. Arbaugh et al, "A Secure and Reliable Bootstrap Architecture", http://www.cs.umd.edu/~waa/pubs/oakland97.pdf.

* cited by examiner

*Primary Examiner*—Kambiz Zand
*Assistant Examiner*—Jason K. Gee
(74) *Attorney, Agent, or Firm*—Wei Te Chung

(57) ABSTRACT

A system and method for firmware authentication includes a first memory with the firmware embedded therein, a programmable microprocessor, and a microprocessor coupling the first memory and the programmable microprocessor. The firmware includes a first cryptographic algorithm unit. The programmable microprocessor includes a second memory for storing a second cryptographic algorithm unit. The microprocessor runs the first cryptographic algorithm unit and generates a first digital signature. The programmable microprocessor runs the second cryptographic algorithm unit and generates a second digital signature. The microprocessor then runs a verification of the first and the second digital signatures. If the first digital signature and the second digital signature are identical to each other, the authentication of the firmware is accomplished; otherwise, the system halts.

2 Claims, 2 Drawing Sheets

SYSTEM AND METHOD FOR FIRMWARE AUTHENTICATION

BACKGROUND OF THE INVENTION

1. Field of the Invention

The present invention relates to a system and method for firmware authentication.

2. Description of the Prior Art

As information technology (IT) develops, people rely more on information technology to handle daily work. Therefore, the security of IT products is becoming more and more a serious issue. One critical factor for an IT product is that its firmware is commonly used in an attached storage. The firmware is essentially a set of machine code, typically stored in some form of a non-volatile memory. The firmware for an IT product allows a Central Processing Unit (CPU) to perform functions such as initialization, diagnostics, loading the operating system kernel from mass storage, and input/output (I/O). U.S. Pat. No. 5,937,063 discloses a secure subsystem to prevent unauthorized replacement of a storage device containing a boot-up firmware by establishing a secure path between a secure boot device and a host processor based on an electronic keying mechanism. The secure boot device is coupled to the storage device and encrypts the firmware based on a secret key to generate an encrypted code. The host processor then decrypts the encrypted code based on the same secret key to generate a decrypted code. The host processor executes the decrypted code only if the decrypted code corresponds to the firmware. A communication path is established between the secure boot device and the host processor to allow the two processors to communicate securely by exchanging such encrypted messages. However, the secret key is an encoding and/or decoding parameter used by conventional cryptographic algorithms such as Rivest, Shamir and Adleman ("RSA"), Data Encryption Algorithm ("DEA") as specified in Data Encryption Standard ("DES") and the like. If the secret key is acquired by an intruder, the intruder can remove the storage device containing the boot-up firmware and substitutes another, unauthorized boot-up device for the authorized storage device.

Hence, an improved system and method that overcomes the above-mentioned deficiencies of current firmware authentication is desired.

BRIEF SUMMARY OF THE INVENTION

A main object of the present invention is to provide a system and method for firmware authentication which prevents unauthorized firmware from being used.

An authentication system and method for preventing unauthorized firmware from being used in a data processing system includes a first memory with the firmware embedded therein, a programmable microprocessor, and a microprocessor coupled between the first memory and the programmable microprocessor. The firmware includes a random value generator unit, a first cryptographic algorithm unit and a verifying unit. The programmable microprocessor includes a second memory for storing a second cryptographic algorithm unit. The authentication method of the firmware comprises: the microprocessor running the random value generator unit, getting some random values, generating a key using the random values, and running the first cryptographic algorithm unit using the key to generate a first digital signature; the programmable microprocessor running the second cryptographic algorithm unit using the same key to generate a second digital signature; and the microprocessor running the verifying unit to compare the first and the second digital signatures. If the signatures match each other, the authentication of the firmware is accomplished; otherwise, the system halts.

Other objects and advantages of the present invention will become more apparent from the following detailed description when taken in conjunction with the accompanying drawings.

DETAILED DESCRIPTION OF THE INVENTION

Figure 1:
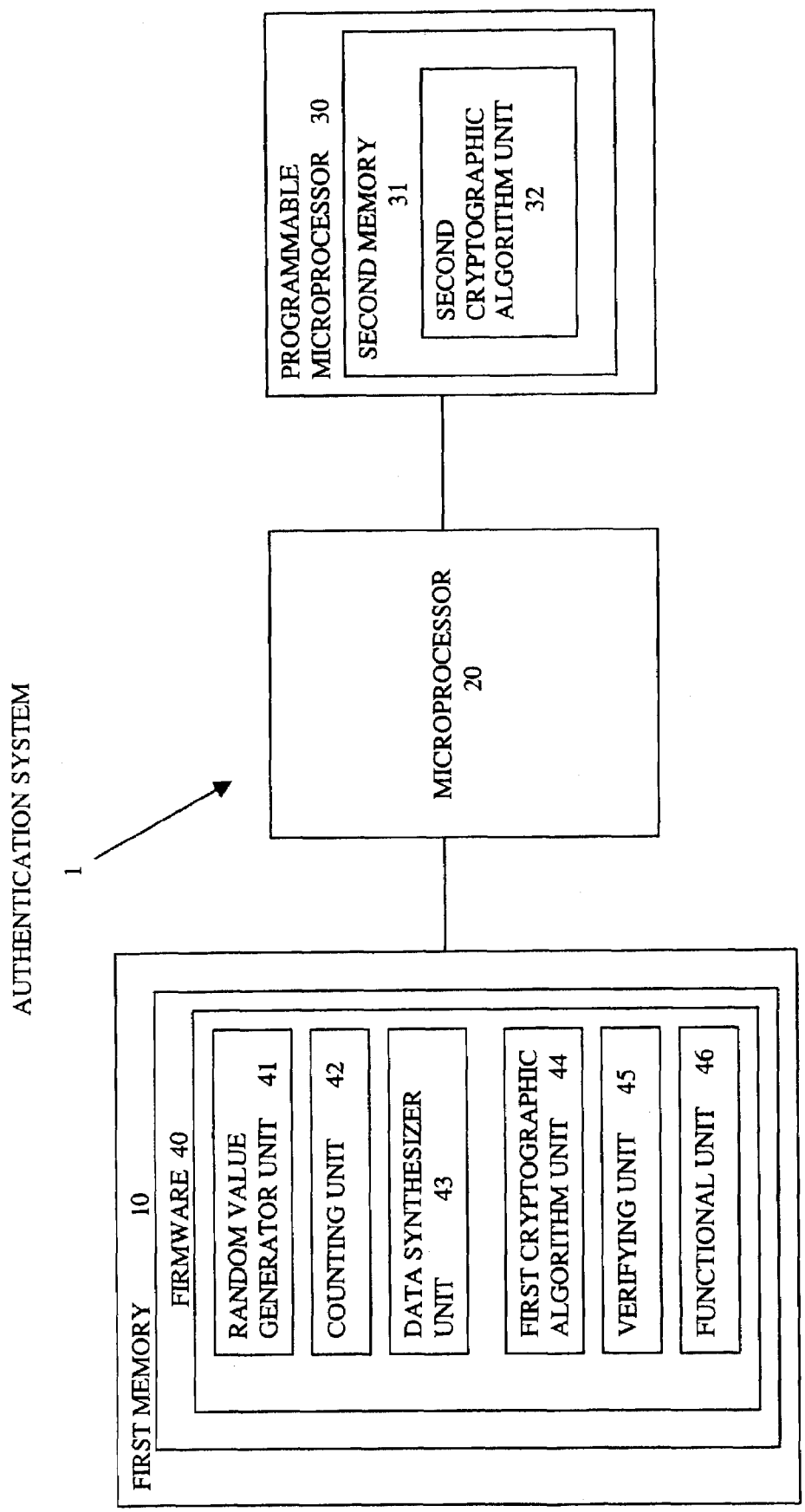
FIG. 1 is a block diagram of a system for firmware authentication according to the present invention.

Referring to FIG. 1, an authentication system 1 includes a first memory 10, a programmable microprocessor 30 and a microprocessor 20 coupled between the first memory 10 and the programmable microprocessor 30. The first memory 10 has firmware 40 embedded therein. The firmware 40 includes a random value generator unit 41, a counting unit 42, a data synthesizer unit 43, a first cryptographic algorithm unit 44, a verifying unit 45 and a functional unit 46. The programmable microprocessor 30 has a second memory 31 including a second cryptographic algorithm unit 32. In the present invention, the first memory 10 and the second memory 31 are both read only memories (ROM).

Figure 2:
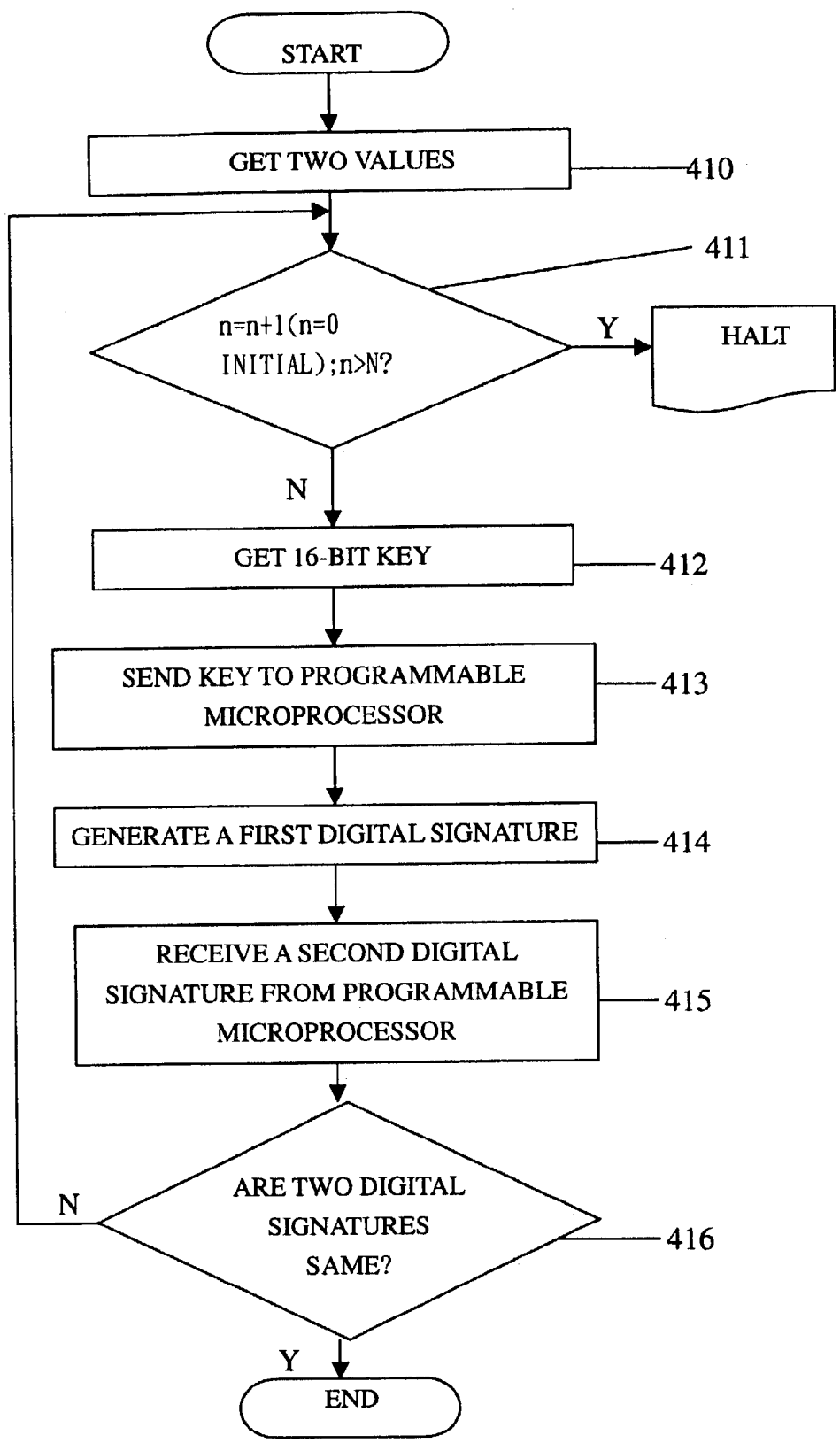
FIG. 2 is a flowchart of a method for firmware authentication according to the present invention.

Referring now to FIGS. 1 and 2, a method for authentication of the firmware 40 comprises the following steps:

i) In step 410, after the authentication system 1 is booted up, the microprocessor 20 sends a read request to the first memory 10 and runs the random value generator unit 41 in the firmware 40 and gets two random values.

ii) In step 411, the microprocessor 20 increments a number n (the initial value of the number n is 0) by running the counting unit 42; if the value of the number n is greater than a predetermined value N, the microprocessor 20 will be halted, thereby halting the authentication system 1. If the value of the number n is less than the predetermined value N, the microprocessor 20 will proceed with the next step 412.

iii) In step 412, the microprocessor 20 runs the data synthesizer unit 43 using said two random values as input values, thereby getting a 16-bit key.

iv) In step 413, the microprocessor 20 sends the 16-bit key to the programmable microprocessor 30.

v) In step 414, the microprocessor 20 runs the first cryptographic algorithm unit 44 using the key as an input value, and generates a first digital signature.

vi) In step 415, executed concurrently with step 414, the programmable microprocessor 30 runs the second cryptographic algorithm unit 32 embedded in the second memory 31 using the same key as an input value, and generates a second digital signature and sends it to the microprocessor 20.

vii) In step 416, the microprocessor 20 verifies the first and the second digital signatures by running the verifying unit 45. If the first digital signature is identical to the second digital signature, the authentication for the firmware 40 is accomplished and the functional unit 46 in the firmware 40 will be executed. If not, the procedure will return to step 411 and proceed with the next authentication attempt for the firmware 40.

In the present invention, the first cryptographic algorithm unit 44 is identical to the second cryptographic algorithm unit 32, and the first digital signature will be identical to the second digital signature. The first and second digital signatures can be compared by running the verifying unit 45, which can be a comparator unit which verifies whether the two digital signatures are identical to each other. Alternatively, the first cryptographic algorithm unit 44 may be different from the second cryptographic algorithm unit 32, and the verifying unit 45 can correspondingly be a complementary comparator for verifying whether the two digital signatures are complements of each other, which means that the two digital signatures satisfy a predetermined formula.

An advantage of the present invention over the prior art is that the second cryptographic algorithm unit 32 embedded in the programmable microprocessor 30 is difficult to duplicate. If the firmware 40 embedded in the first memory 10 is duplicated without authorization, the first cryptographic algorithm unit 44 of the unauthorized firmware 40 will not be identical to the second cryptographic algorithm unit, so the authentication of the firmware 40 will not be accomplished and the unauthorized firmware 40 will not be used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for firmware authentication comprising:
   a first memory having a firmware embedded therein, the firmware including a random value generator unit, a counting unit, a first cryptographic algorithm unit, and a verifying unit;
   a programmable microprocessor including a second memory having a second cryptographic algorithm unit embedded therein; and
   a microprocessor coupling the first memory and the programmable microprocessor;
   wherein the microprocessor runs the random value generator unit to get random values, the firmware has a data synthesizer unit, the microprocessor runs the data synthesizer unit using the random values generated by the random value generator unit as the input values to the data synthesizer unit to get a 16-bit key, which key is processed value, and respectively sends the key to the first and the second cryptographic algorithm units, and the first cryptographic algorithm unit using a processed value of the generated random values to get a first digital signature, the programmable microprocessor runs the second cryptographic algorithm unit which is identical to the first cryptographic algorithm unit using the same processed value of the generated random values to get a second digital signature, then the microprocessor runs the verifying unit to verify whether the first and the second digital signatures are identical to each other to thereby authenticate the firmware, the microprocessor running the counting unit for preventing a closed-loop, wherein the microprocessor increments a number by running the counting unit, if the number is greater than a predetermined value, the microprocessor will be halted, thereby halting the authentication system, if the number is less than the predetermined value, the microprocessor will proceed.

2. A method for preventing unauthorized firmware from being used in a data processing system, comprising the following steps:
   i) providing an authentication system including:
      a first memory with a firmware to be authenticated embedded therein, the firmware including a random value generator unit, a counting unit, a first cryptographic algorithm unit and a verifying unit;
      a programmable microprocessor including a second memory with a second cryptographic algorithm unit embedded therein; and
      a microprocessor coupling the first memory and the programmable microprocessor;
   ii) actuating the microprocessor to execute the random value generator unit, producing a set of random values;
   iii) actuating the microprocessor to run the counting unit for preventing a closed-loop, wherein the microprocessor runs the counting unit to increment a number just prior to each run of the data synthesizer unit, and to compare the number to a predetermined value N, wherein, if the value of the number is greater than N, the microprocessor halts; and if—the number is less than N, the microprocessor proceeds;
   iv) actuating the microprocessor to execute the first cryptographic algorithm unit using a processed value of the generated random values as an input value, generating a first digital signature;
   v) actuating the programmable microprocessor to execute the second cryptographic algorithm unit using the same processed value of the generated random values as an input value, generating a second digital signature; and
   vi) actuating the microprocessor to execute the verifying unit to compare the first and the second digital signatures, wherein if the first digital signature matches the second digital signature, the authentication of the firmware is accomplished otherwise, the system halts;
   wherein the firmware includes a data synthesizer unit and the microprocessor is actuated to execute the data synthesizer unit using said random values as input values to get a 16-bit key, the microprocessor executes the first cryptographic algorithm unit using the key instead of the random values as input value, generating a first digital signature, and the programmable microprocessor executes the second cryptographic algorithm unit using same key instead of the random values as input value, generating a second digital signature.

* * * * *